(12) United States Patent
Lee et al.

(10) Patent No.: US 9,844,094 B2
(45) Date of Patent: Dec. 12, 2017

(54) METHOD AND APPARATUS FOR CONFIGURING A DISCONTINUOUS RECEPTION (DRX) OPERATION IN A WIRELESS COMMUNICATION SYSTEM

(71) Applicant: LG ELECTRONICS INC., Seoul (KR)

(72) Inventors: Sunyoung Lee, Seoul (KR); Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 14/415,386

(22) PCT Filed: Aug. 8, 2013

(86) PCT No.: PCT/KR2013/007144
§ 371 (c)(1),
(2) Date: Jan. 16, 2015

(87) PCT Pub. No.: WO2014/025211
PCT Pub. Date: Feb. 13, 2014

(65) Prior Publication Data
US 2015/0208462 A1    Jul. 23, 2015

Related U.S. Application Data

(60) Provisional application No. 61/681,630, filed on Aug. 10, 2012.

(51) Int. Cl.
*G08C 17/00* (2006.01)
*H04W 76/04* (2009.01)
(Continued)

(52) U.S. Cl.
CPC ..... *H04W 76/048* (2013.01); *H04W 52/0209* (2013.01); *H04W 52/0212* (2013.01); *H04W 72/042* (2013.01); *Y02B 60/50* (2013.01)

(58) Field of Classification Search
CPC ............. H04W 52/0203; H04W 52/02; H04W 52/0209; H04W 72/042; H04W 76/048
See application file for complete search history.

(56) References Cited

U.S. PATENT DOCUMENTS

2008/0293426 A1   11/2008  Kim et al.
2009/0181670 A1    7/2009  Tseng
(Continued)

FOREIGN PATENT DOCUMENTS

EP          2 003 861 A2   12/2008
KR   10-2007-0066975 A      6/2007
(Continued)

*Primary Examiner* — Ricky Ngo
*Assistant Examiner* — Phong La
(74) *Attorney, Agent, or Firm* — Birch, Stewart, Kolasch & Birch, LLP (57) ABSTRACT

A method for configuring a DRX (Discontinuous Reception) operation in a wireless communication system, and a wireless device therefore are discussed. The method includes, for example, receiving a first configuration for the DRX; starting a first onDuration timer according to the first configuration; receiving a second configuration for the DRX while the first onDuration timer is running; and stopping the first onDuration timer when the second configuration is received from the transmitter. At least one physical downlink control channel (PDCCH) is not monitored when the first onDuration timer is stopped. The first OnDuration timer is stopped without receiving a DRX Command medium access control (MAC) control element (CE). The method further includes starting a second onDuration timer according to the second configuration; and monitoring at least one PDCCH during an (Continued)

operation time of the second onDuration timer after the second onDuration timer starts according to the second configuration.

4 Claims, 6 Drawing Sheets

(51) Int. Cl.
   *H04W 52/02* (2009.01)
   *H04W 72/04* (2009.01)

(56) References Cited

U.S. PATENT DOCUMENTS

| | | | | |
|---|---|---|---|---|
| 2009/0232054 | A1* | 9/2009 | Wang | H04W 52/0225 370/328 |
| 2011/0199910 | A1* | 8/2011 | Oh | H04W 52/0229 370/241 |
| 2011/0199951 | A1* | 8/2011 | Kwon | H04W 52/0212 370/311 |
| 2011/0292851 | A1* | 12/2011 | Fong | H04L 5/001 370/311 |
| 2012/0082077 | A1* | 4/2012 | Zhang | H04W 72/1215 370/311 |
| 2012/0120815 | A1* | 5/2012 | Anderson | H04W 76/048 370/252 |
| 2012/0120828 | A1* | 5/2012 | Anderson | H04W 52/0225 370/252 |
| 2013/0114483 | A1* | 5/2013 | Suzuki | H04W 76/048 370/311 |
| 2013/0114484 | A1* | 5/2013 | Suzuki | H04W 68/025 370/311 |
| 2013/0163493 | A1* | 6/2013 | Manepalli | H04W 52/0251 370/311 |
| 2013/0242833 | A1* | 9/2013 | Ahn | H04W 72/082 370/311 |
| 2013/0294307 | A1* | 11/2013 | Johansson | H04W 52/0209 370/311 |
| 2014/0247765 | A1* | 9/2014 | Baghel | H04W 52/0203 370/311 |
| 2014/0269480 | A1* | 9/2014 | Han | H04W 76/048 370/311 |
| 2015/0208462 | A1* | 7/2015 | Lee | H04W 52/0212 370/311 |

FOREIGN PATENT DOCUMENTS

| | | |
|---|---|---|
| KR | 10-2009-0077704 A | 7/2009 |
| WO | WO 2011/102644 A2 | 8/2011 |

* cited by examiner

METHOD AND APPARATUS FOR CONFIGURING A DISCONTINUOUS RECEPTION (DRX) OPERATION IN A WIRELESS COMMUNICATION SYSTEM

CROSS REFERENCE TO RELATED APPLICATIONS

This application is the National Phase of PCT/KR2013/007144 filed on Aug. 8, 2013, which claims priority under 35 U.S.C. 119(e) to U.S. Provisional Application No. 61/681,630 filed on Aug. 10, 2012, all of which are hereby expressly incorporated by reference into the present application.

TECHNICAL FIELD

The present invention relates to wireless communications, and more particularly, to a method and apparatus for configuring a DRX operation in a wireless communication system.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Discontinuous reception (DRX) is a method for reducing battery consumption by allowing a user equipment (UE) to discontinuously monitor a downlink channel. When the DRX is configured, the UE discontinuously monitors the downlink channel. Otherwise, the UE continuously monitors the downlink channel.

Recently, many applications require an always-on characteristic. Always-on is a characteristic in which the UE is always connected to a network so as to directly transmit data whenever necessary.

However, since battery consumption is great when the UE continuously maintains the network connection, a proper DRX is configured in a corresponding application to guarantee the always-on characteristic while reducing battery consumption.

Recently, several various applications are running in parallel in one UE, and thus it is not easy to configure one DRX suitable for all of the applications. This is because, even if an optimal DRX is configured for a specific application, it may be a not proper DRX configuration with respect to other applications which are running in parallel.

There is a need for a method for operating the DRX in a more flexible manner.

DISCLOSURE OF INVENTION

Technical Problem

The present invention provides a method and apparatus for configuring a DRX operation in a wireless communication system.

The present invention also provides a method and apparatus for controlling onDuration for a DRX operation in a wireless communication system.

The present invention also provides a method and apparatus for controlling PDCCH monitoring for a DRX operation in a wireless communication system.

Solution to Problem

In an aspect, a method for configuring a DRX (Discontinuous Reception) operation in a wireless communication system is provided. The method may include applying a first configuration for the DRX, starting a onDuration timer according to the first configuration, receiving a second configuration for the DRX, and stopping the onDuration timer which is running according to the first configuration.

The method may further include receiving a DRX configuration; and stopping an onDuration timer upon receiving the DRX configuration if the onDuration timer is running.

The method may further include comparing the received DRX configuration with a previous DRX configuration, wherein the comparing step includes determining that an onDurationTimer or a drxStartOffset in the received DRX configuration is changed.

In another aspect, a wireless device for configuring a DRX (Discontinuous Reception) operation in a wireless communication system is provided. The wireless device includes a radio frequency unit for receiving a radio signal; and a processor, operatively coupled with the radio frequency unit, configured to apply a first configuration for the DRX, start a onDuration timer according to the first configuration, receive a second configuration for the DRX, and stop the onDuration timer which is running according to the first configuration.

Advantageous Effects of Invention

The proposed invention includes that a DRX configuration and DRX operation with more rapidly and efficiently is provided. Especially, it is possible to prevent the UE from unnecessarily monitoring a PDCCH when a reconfigured DRX configuration from the eNB is received. Thus, it can be advantaged that the UE reduces a power consumption of useless monitoring the PDCCH and the UE applies the modified DRX configuration for the DRX operation.

BEST MODE FOR CARRYING OUT THE INVENTION

Figure 1:
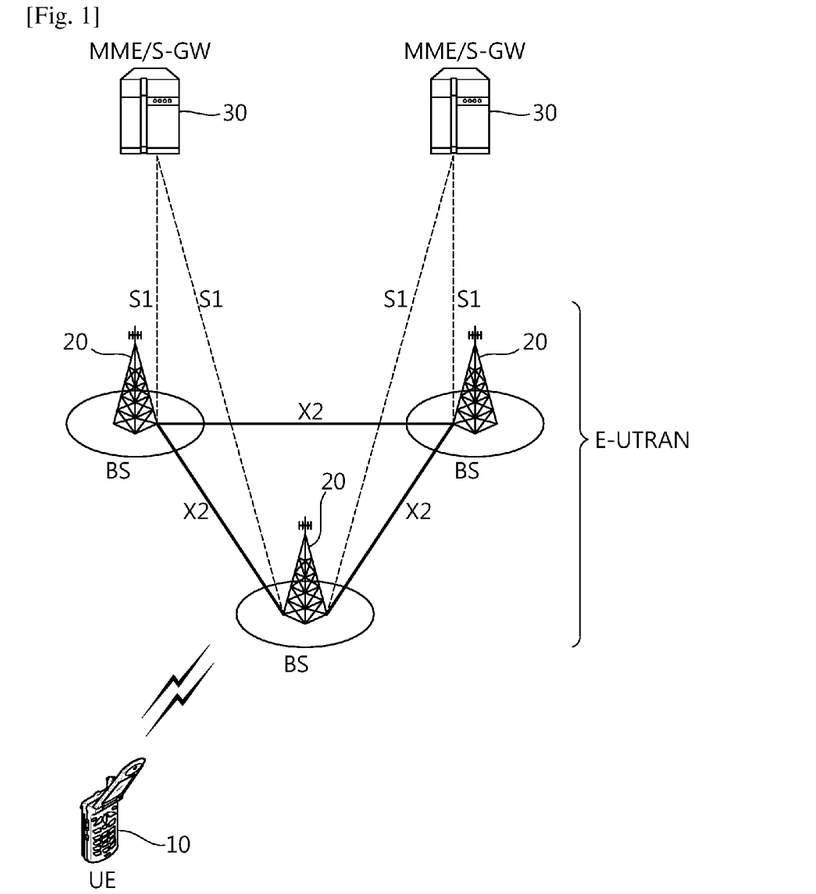
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
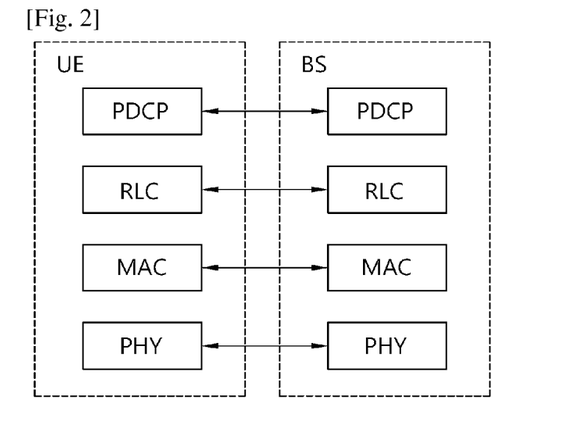
FIG. 2 is a diagram showing a radio protocol architecture for a user plane to which the present invention is applied.
Figure 3:
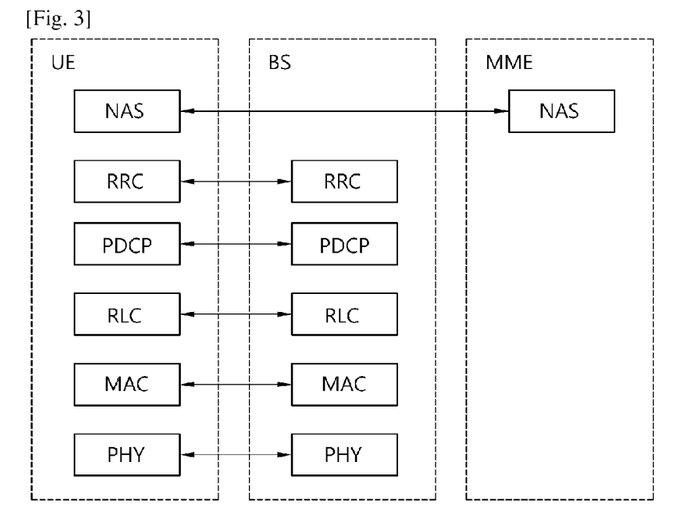
FIG. 3 is a diagram showing a radio protocol architecture for a control plane to which the present invention is applied to which the present invention is applied.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

The 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The wireless communication system as 3GPP LTE of the present invention uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Now, discontinuous reception (DRX) in a wireless communication system, as example, 3GPP LTE will be described.

The DRX is a method for reducing battery consumption of a UE by allowing the UE to discontinuously monitor a downlink channel.

Figure 4:
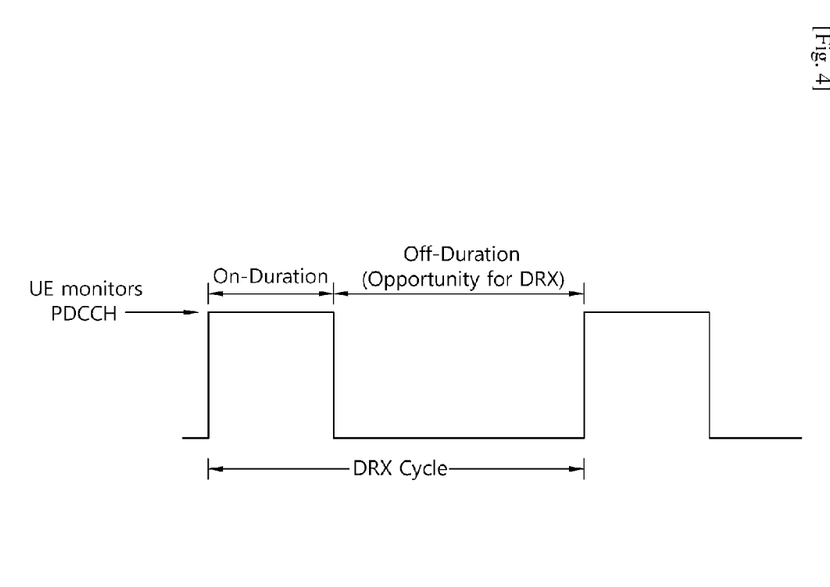
FIG. 4 shows a DRX cycle to which the present invention is applied.

FIG. 4 shows a DRX cycle to which the present invention is applied.

A DRX cycle specifies the periodic repetition of the on-duration followed by a possible period of inactivity. The DRX cyclic includes an on-duration and an off-duration. The on-duration is a duration in which a UE monitors a PDCCH within the DRX cycle. The DRX cycle has two types, i.e., a long DRX cycle and a short DRX cycle. The long DRX cycle which has a long period can minimize battery consumption of the UE. The short DRX cyclic which has a short period can minimize a data transmission delay.

When the DRX is configured, the UE may monitor the PDCCH only in the on-duration and may not monitor the PDCCH in the off-duration.

An onDuration timer is used to define the on-duration. The on-duration can be defined as a duration in which the onDuration timer is running. The onDuration timer may specify the number of consecutive PDCCH-subframe(s) at the beginning of a DRX Cycle. The PDCCH-subframe specifies a subframe in which the PDCCH is monitored.

In addition to the DRX cycle, a duration in which the PDCCH is monitored can be further defined. A duration in which the PDCCH is monitored is collectively referred to as an active time.

A drx-Inactivity timer deactivates the DRX. If the drx-Inactivity timer is running, the UE continuously monitors the PDCCH irrespective of the DRX cycle. The drx-Inactivity timer starts upon receiving an initial UL grant or DL grant on the PDCCH. The drx-Inactivity timer may specify the number of consecutive PDCCH-subframe(s) after successfully decoding a PDCCH indicating an initial UL or DL user data transmission for this UE.

A HARQ RTT timer defines a minimum duration in which the UE expects HARQ retransmission. The HARQ RTT timer may specify the minimum amount of subframe(s) before a DL HARQ retransmission is expected by the UE.

A drx-Retransmission timer defines a duration in which the UE monitors the PDCCH while expecting DL retransmission. The drx-Retransmission timer may specify the maximum number of consecutive PDCCH-subframe(s) for as soon as a DL retransmission is expected by the UE. After initial DL transmission, the UE starts the HARQ RTT timer. When an error is detected for the initial DL transmission, the UE transmits NACK to a BS, stops the HARQ RTT timer, and runs the drx-Retransmission timer. The UE monitors the PDCCH for DL retransmission from the BS while the drx-Retransmission timer is running.

An Active Time can include an on-duration in which the PDCCH is periodically monitored and a duration in which the PDCCH is monitored due to an event occurrence.

When a DRX cycle is configured, the Active Time includes the time while:
  onDuration timer or drx-Inactivity timer or drx-Retransmission timer or mac-ContentionResolution timer is running; or
  a Scheduling Request is sent on PUCCH and is pending; or
  an uplink grant for a pending HARQ retransmission can occur and there is data in the corresponding HARQ buffer; or
  a PDCCH indicating a new transmission addressed to the C-RNTI of the UE has not been received after successful reception of a Random Access Response for the preamble not selected by the UE.

Figure 5:
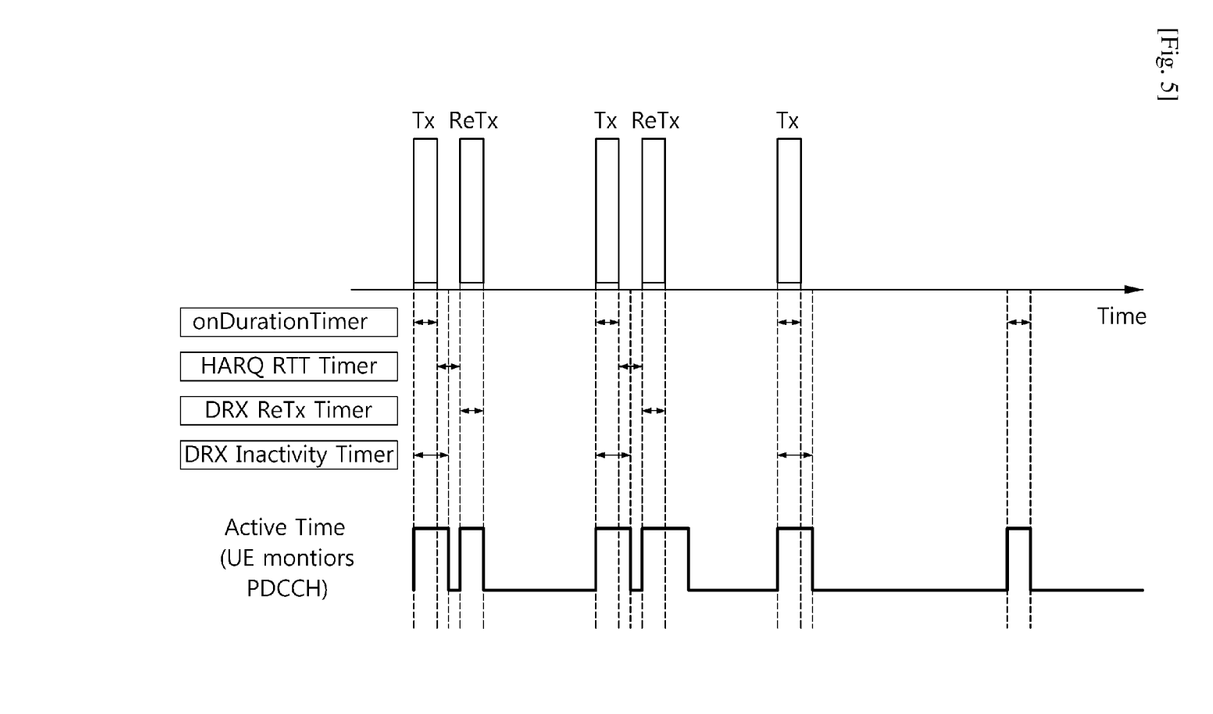
FIG. 5 shows active time for DRX operation to which the present invention is applied.

FIG. 5 shows active time for DRX operation to which the present invention is applied.

When DRX is configured, the UE shall for each subframe:
  if a HARQ RTT Timer expires in this subframe and the data of the corresponding HARQ process was not successfully decoded:
  start the drx-Retransmission timer for the corresponding HARQ process.
  if a DRX Command MAC CE (control element) is received:
  stop onDuration timer and drx-Inactivity timer.
  if drx-InactivityTimer expires or a DRX Command MAC CE is received in this subframe:
  if the Short DRX cycle is configured:
  start or restart drx-ShortCycle timer and use the Short DRX Cycle.
  else:
  use the Long DRX cycle.
  if drx-ShortCycle timer expires in this subframe:
  use the Long DRX cycle.
  If the Short DRX Cycle is used and [(SFN*10)+subframe number]modulo (shortDRX-Cycle)=(drxStartOffset) modulo (shortDRX-Cycle); or if the Long DRX Cycle is used and [(SFN*10)+subframe number]modulo (longDRX-Cycle)=drxStartOffset:
start onDuration timer.
during the Active Time, for a PDCCH-subframe, if the subframe is not required for uplink transmission for half-duplex FDD UE operation and if the subframe is not part of a configured measurement gap:
monitor the PDCCH;
if the PDCCH indicates a DL transmission or if a DL assignment has been configured for this subframe:
start the HARQ RTT timer for the corresponding HARQ process;
stop the drx-Retransmission timer for the corresponding HARQ process.
if the PDCCH indicates a new transmission (DL or UL):
start or restart drx-Inactivity timer.
when not in Active Time, type-0-triggered SRS shall not be reported.
if CQI masking (cqi-Mask) is setup by upper layers:
when onDurationTimer is not running, CQI/PMI/RI/PTI on PUCCH shall not be reported.
else:
when not in Active Time, CQI/PMI/RI/PTI on PUCCH shall not be reported.

As mentioned, the active-time is defined a total duration that the UE is awake. This includes the on-duration of the DRX cycle, the time UE is performing continuous reception while the inactivity timer has not expired and the time UE is performing continuous reception while waiting for a DL retransmission after one HARQ RTT. Based on the above the minimum active time is of length equal to on-duration, and the maximum is undefined (infinite).

As described in FIG. 5, a UE starts an onDurationTimer in a specific subframe in accordance with discontinuous reception (DRX) configuration configured by an eNB. The UE can monitor PDCCH while the onDurationTimer is running with the DRX configuration. The On Duration starts and is maintained while the onDurationTimer is running. Only the DRX Command MAC CE can stop the running onDurationTimer. However, the eNB may transmit an RRC signal that configures new DRX configuration to the UE in consideration of traffic or scheduling.

Figure 6:
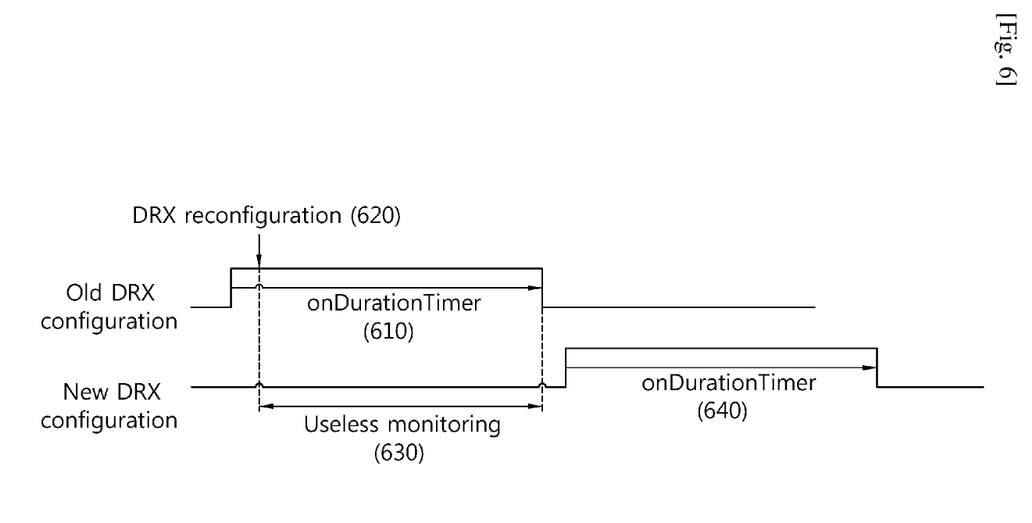
FIG. 6 shows an example of monitoring PDCCH in a radio communication system.

FIG. 6 illustrates an example of monitoring PDCCH in a radio communication system. In particular, FIG. 6 illustrates a situation in which the UE continuously monitors a PDCCH with DRX configuration before while a new signal for configuring a DRX configuration newly is received to modify the DRX configuration from the eNB.

Referring to FIG. 6, the UE receives a RRC signal that configures the DRX configuration information from the eNB and determines operation time of a DRX related timer in accordance with the configured DRX configuration information. Herein, the UE calculates starting points of timers using configured offset values, and then applies DRX operation. For example, the UE determines whether a shortDRX-Cycle is configured through the RRC signal and determines a starting point of the onDurationTimer in consideration of a drxStartOffset and a shortDRX-Cycle value in the received DRX configuration information when the shortDRX-Cycle is configured. In addition, the operation time of the onDurationTimer is determined by an onDurationTimer value determined in the DRX configuration information.

Therefore, 610 denotes a state in which the UE starts the onDurationTimer to run at a determined point in time calculated in accordance with the DRX configuration information and the On Duration is maintained while the onDurationTimer is running.

On the other hand, the eNB may change the DRX configuration to new DRX configuration in consideration of a communication environment of the UE, such as traffic or scheduling policy. Then, the eNB may reconfigure a DRX configuration and transmit a new DRX configuration to the UE. At this time, a RRC signal may be used for the new DRX configuration to be transmitted. The UE receives the RRC signal reconfiguring the DRX configuration from the eNB in a subframe where the onDurtaionTimer is running in accordance with the previous DRX configuration (620).

However, the UE does not apply the new DRX configuration with the DRX reconfiguration to perform a new DRX operation even though the RRC signal including the new DRX configuration is received. And the UE still waits for a predetermined running time when the currently running onDurationTimer expires. In communication rule, the UE can stop the running onDurationTimer only when the DRX Command MAC CE is received from the eNB. That is, the onDuration keeps running with old DRX configuration even though it is not the onDuration in the newly received DRX configuration.

Therefore, the UE has to monitor the PDCCH continuously in onDuration subframes determined in accordance with previous DRX configuration information (630). If the onDurationtimer is configured as up to 200 ms in the DRX configuration, the UE keeps monitoring the PDCCH up to 200 ms, so it is not desirable in terms of power consumption of the UE.

That is, the DRX operation that does not contribute to actual power consumption of the UE may be performed although the DRX operation for optimizing power consumption of the UE is supported. In other words, a useless monitoring the PDCCH is maintained, like in 630, although the new DRX configuration is received for scheduling policy from the eNB. The UE unnecessarily monitors the PDCCH in the predetermined onDurationTimer value in accordance with the previous DRX configuration information against the DRX of the UE.

To solve this problem in the communication field, more effective DRX operation of the UE can be suggested according to the present invention. It shows that a new DRX configuration is applied when the UE receives the RRC signal that reconfigures DRX configuration from the eNB in the subframe where the onDurationTimer is running.

Figure 7:
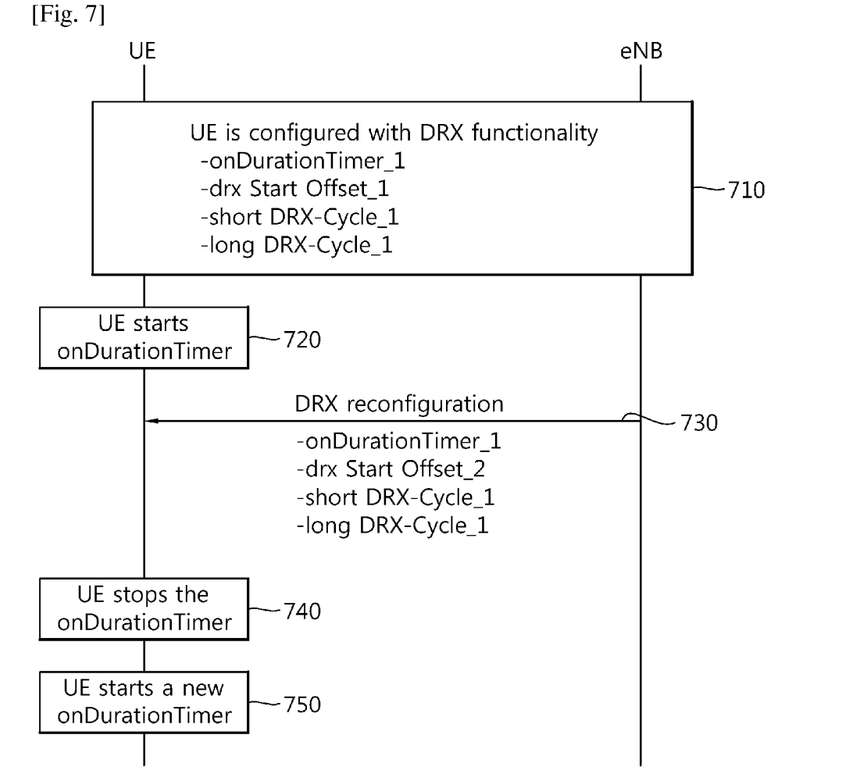
FIG. 7 shows a signalling flowchart illustrating the DRX operation of the UE according to an embodiment of the present invention.

FIG. 7 is a signalling flowchart illustrating the DRX operation of the UE according to an embodiment of the present invention. In particular, according to the present invention, the UE determines that the new onDurationTimer configuration is changed from the eNB to stop running of the onDurtionTimer while the onDurationiTimer is running. To be specific, the UE controls to stop the running onDurationTimer in a case where it is determined that configuration of the onDuration is changed.

Referring to FIG. 7, in 710, the UE receives configuration information for performing the DRX operation from the eNB and configures with DRX functionality. In particular, the UE receives a RRC signal including timers related to the DRX operation and configuration, i.e., the DRX operation is specified by the DRX-config IE (information element) in the RRC signaling, which includes onDurationTimer, drx-InactivityTimer, drx-RetransmissionTimer, drxStartOffset, shortDRX-cycle, and drxShortCycleTimer. The following <Table 1> illustrates the DRX configuration information as an example.

TABLE 1

```
DRX-Config ::= CHOICE {release NULL, setup SEQUENCE {
onDurationTimer ENUMERATED { psf1, psf2, psf3, psf4, psf5, psf6, ...,
psf200}, drx-InactivityTimer ENUMERATED { psf1, psf2, psf3, psf4,
psf5, psf6, ....psf0-v1020,..., spare2, spare1}, drx-RetransmissionTimer
ENUMERATED { psf1, psf2, psf4, psf6, psf8, psf16, psf24, psf33},
longDRX-CycleStartOffset CHOICE { sf10 INTEGER(0..9), ..., sf2560
INTEGER(0..2559)}, shortDRX SEQUENCE { shortDRX-Cycle
ENUMERATED{ sf2, sf5, sf8, sf10, sf16, sf20, ..., sf640 },
drxShortCycleTimer INTEGER (1..16) } OPTIONAL -- Need OR}}
```

As described, the timers for the DRX functionality include onDurationTimer, drx-InactivityTimer, drx-RetransmissionTimer. Each Value of timers such as InactivityTimer and drx-RetransmissionTimer may be defined as the number of predetermined continuous PDCCH subframes. Different psf (PDCCH subframes) values may be configured in accordance with the respective timers. And Long DRX Cycle configuration information elements include the longDRX-Cycle and the value of the drxStartOffset. The longDRX-CycleStartOffset may determine a starting point based on an interger among predetermined interfers from 0 to N (an interfer larger than 0) in the configured subframe. Optionally, the Short DRX Cycle configuration information elements include the drxShortCycleTimer and shortDRX-Cycle. A period of the shortDRX-Cycle may be defined as the subframe and the drxShortCycleTimer may be defined as one of integers from 0 to 16.

Hereinafter, according to the present invention, _1 is taken as an example for easily describing the DRX configuration information in order to distinguish the previous DRX configuration information from new DRX configuration information obtained by DRX reconfiguration to be received later. For example, in 710, it is showed that the UE receives the RRC signal including onDurationTimer_1, drxStartOffset_1, shortDRX-Cycle_1, and longDRX-Cycle_1 from the eNB.

In 720, the UE calculates the onDuration based on the DRX configuration information of the received RRC signal, in particular, onDurationTimer_1, drxStartOffset_1, shortDRX-Cycle_1, and longDRX-Cycle_1 and determines the onDurationTimer at predetermined time. The UE starts to run the onDurationTimer in a predetermined value of onDurationTimer (720).

For the meanwhile, the UE may receive the newly configured DRX configuration information in consideration of the traffic or scheduling policy for the UE from the eNB (730). The modified DRX configuration information may be transmitted through the RRC signal for reconfiguration since the eNB configures new DRX because it is determined that it is necessary for the UE to change the DRX configuration information.

For example, the previous DRX configuration information may be changed in consideration of the traffic or scheduling with other UEs in a cell. In 730, for example, the UE may receive onDurationTimer_1, drxStartOffset_2, shortDRX-Cycle_1, and longDRX-Cycle_1 as the DRX configuration information newly configured for the DRX operation from the base station.

In 740, the UE stops the running onDurationTimer in order to efficiently and rapidly perform the DRX operation in accordance with the changed DRX configuration information.

In 750, the UE considering the RRC signal newly received from the eNB calculates a new onDuration start point in time based on configuration values of onDurationTimer_1, drxStartOffset_2, shortDRX-Cycle_1, and longDRX-Cycle_1 and starts the corresponding onDurationTimer at predetermined point in time.

Therefore, the UE may more actively cooperate with new scheduling of the eNB in accordance with the newly configured DRX configuration information without unnecessarily maintaining the onDuration as monitoring the PDCCH with the previous DRX configuration.

Wherein the step of the stopping the onDuration timer in the 740, the UE may determine whether the onDuration configuration is changed or not when the RRC signal is newly received from the eNB. It is determined whether the onDuration configuration is changed by comparing configuration values of currently used onDurationTimer, drxStartOffset, shortDRX-Cycle and longDRX-Cycle with configuration values of onDurationTimer, drxStartOffset, shortDRX-Cycle and longDRX-Cycle included in the newly received RRC signal. Herein, when even one of the configuration values of onDurationTimer, drxStartOffset, shortDRX-Cycle and longDRX-Cycle is different from the currently used configuration values, the UE may determine that the onDurtion configuration information is changed.

In particular, the UE determines that at least one subframe, from after the RRC signal including the newly configured DRX configuration information is received to before the new onDurationTimer starts to run with the new configuration, does not correspond to the onDuration in this invention. Therefore, after receiving the RRC signal with the new DRX configuration, the UE may stop the onDurationTimer and may not monitor the PDCCH in the onDuration before running a new onDurationTimer. This includes that the UE may monitor the PDCCH in Active Time as an onDuration made by another timers related to DRX functionality.

In addition, the related timers defined in the DRX configuration information defined in 710 and "1" added to the respective DRX Cycles are for describing an example of the previous DRX configuration information in the present invention. That is, numbers are provided to distinguish the previous DRX configuration information from the new DRX configuration information in accordance with the DRX reconfiguration while performing the DRX operation by applying the new DRX configuration information. "2" in the drxStartOffset_2 of the DRX configuration information in accordance with the DRX reconfiguration is for distinguishing the drxStartOffset_2 from the drxStartOffset_1.

When the RRC signal is actually transmitted, there are no _1 and _2. _1 and _2 are added for example. Therefore, numbers for the DRX configuration information according to the example may be replaced by N and N+1.

In addition, according to the present invention, although there is no numbering for the above-described DRX configuration information, the initial DRX configuration information and the DRX configuration information in accordance with the DRX reconfiguration may be received to stop the onDuration. In addition, another DRX reconfiguration information for the DRX reconfiguration may be received to control the running onDuration.

Therefore, it is possible to prevent the UE from unnecessarily monitoring the PDCCH after receiving the changed/modified onDuration configuration from the eNB and to reduce power consumption of the UE.

Figure 8:
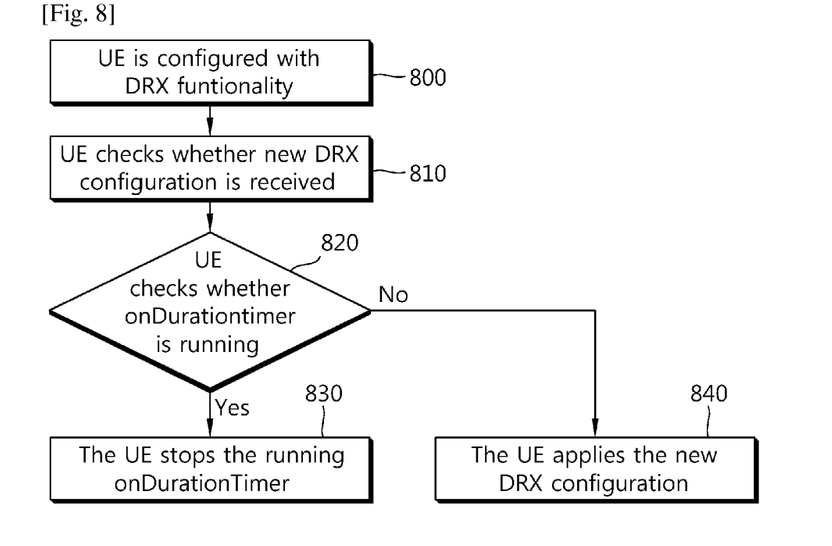
FIG. 8 shows an example of a flow chart by controlling the onDuration with DRX configuration according to an exemplary embodiment of the present invention.

FIG. 8 shows an example of a flow chart by controlling the onDuration with DRX configuration according to an exemplary embodiment of the present invention.

Referring to FIG. 8, the eNB configures to the UE with DRX functionality by RRC signaling, including onDurationTimer, drx-InactivityTimer, drx-RetransmissionTimer, drxStartOffset, and optionally shortDRX-cycle, drxShort-CycleTimer for a DRX operation of the UE (800).

More details, when the UE is configured with the DRX functionality that the short DRX Cycle is configured, the UE uses the short DRX Cycle and the UE starts the drxShort-CycleTimer. If the short DRX Cycle is not configured, the UE uses the long DRX Cycle.

Herein, if the Short DRX Cycle is used, the UE starts the onDurationTimer at a subframe of [(SFN*10)+subframe number]modulo (shortDRX-Cycle)=(drxStartOffset) modulo (shortDRX-Cycle) subframe. Or if the Long DRX Cycle is used, the UE starts the onDurationTimer at a subframe of [(SFN*10)+subframe number]modulo (longDRX-Cycle)=drxStartOffset.

That is, the UE is configured the DRX functionality from the RRC signaling and the onDurationTimer is running at specific subframe using the drxStartOffset and the applied DRX cycle.

The eNB re-configures to the UE with a DRX functionality of a new DRX configuration by RRC signaling including, onDurationTimer, drx-InactivityTimer, drx-RetransmissionTimer, drxStartOffset, shortDRX-cycle, drxShortCycleTimer to configure a new DRX functionality for the UE. It is for that the DRX configuration for the UE can be modified by the eNB considering the traffic and scheduling policy. So the UE can check the DRX re-configuration is received by the RRC signal (810). When the UE receives the new DRX configuration, it immediately applies the new DRX configuration, which means that the starting point and the duration of the timers can be changed by the new DRX reconfiguration. For example, the starting point of the OnDuration can be changed by the new drxStartOffset and shortDRX-Cycle. For this operation, the UE performs following steps.

If the UE receives the new DRX configuration, the UE checks whether the onDurationTimer is running or not (820). Herein the onDurationTimer is in an operation with a previous DRX configuration.

Therefore, when UE determines that the onDurationtimer is in active as a running state and the UE stops the running onDurationTimer (830). That is, the UE stops the onDurationTimer as soon as the UE receives the RRC signaling including the new DRX configuration while there is a running onDurationTimer. So it provides that the UE saves power consumption by not monitoring the PDCCH for DL/UL transmission as stopping the onDurationTimer. It also provides that the UE applies the new DRX configuration without useless monitoring.

Whereas the onDurationtimer is not running, the UE determines that the DRX configuration is re-configured for a DRX operation directly (840). If the short DRX Cycle as the new DRX configuration is configured, the UE uses the short DRX Cycle and the UE starts the drxShortCycleTimer. Else, the UE uses the long DRX Cycle with the new DRX configuration. Especially, the onDurationTimer can start at a new sunframe based of [(SFN*10)+subframe number] modulo (shortDRX-Cycle)=(drxStartOffset) modulo (shortDRX-Cycle) when the Short DRX Cycle of the reconfiguration is used. And if the Long DRX Cycle of the reconfiguration is used, the onDurationTimer starts at a new sunframe based of [(SFN*10)+subframe number]modulo (longDRX-Cycle)=drxStartOffset with the new DRX configuration.

Therefore, when the UE receives modified DRX configuration, it immediately applies the DRX configuration. It means that the UE applies to run the newly received DRX configuration more rapidly according to the eNB scheduling more actively.

In this invention, the UE can stop the onDurationTimer when the UE receives the RRC signaling including the new DRX configuration while there is a running onDurationTimer. First, the UE stops the onDurationTimer when the UE receives the RRC signalling including the new DRX configuration. Following second, the UE can stop the onDurationTimer when the new DRX configuration specifies the On Duration that is different from the On Duration of previous DRX configuration.

Figure 9:
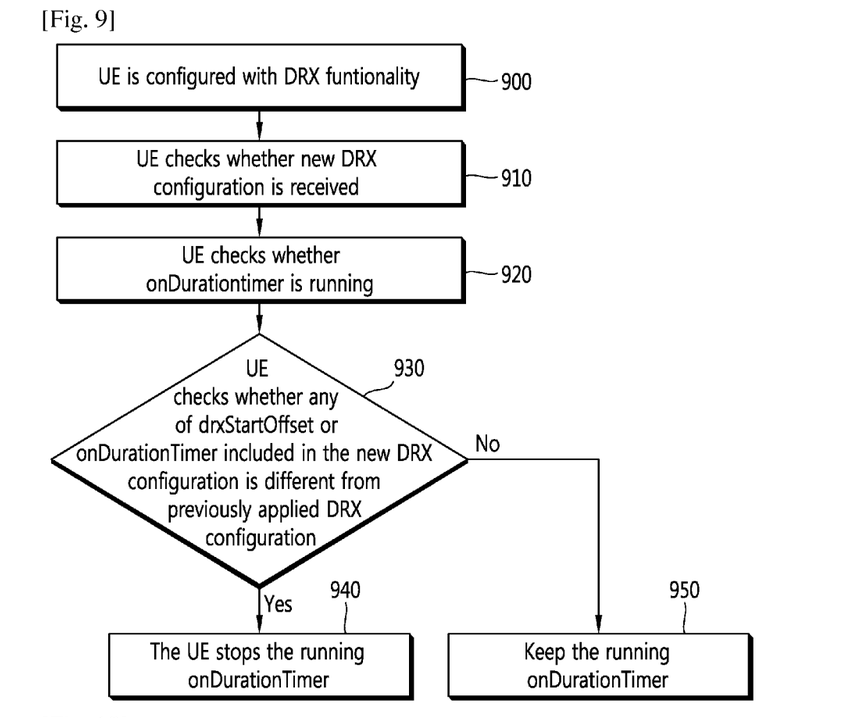
FIG. 9 shows an example of a flow chart by controlling the onDuration with DRX configuration according to an exemplary embodiment of the present invention.

FIG. 9 shows an example of a flow chart by controlling the onDuration with DRX configuration according to an exemplary embodiment of the present invention.

Referring to FIG. 9, the UE is configured with DRX functionality by RRC signaling, including onDurationTimer, drx-InactivityTimer, drx-RetransmissionTimer, drxStartOffset, and optionally shortDRX-cycle, drxShortCycleTimer for a DRX configuration (900). Herein the DRX functionality is same with the step 800 in FIG. 8.

The UE is re-configured with a DRX functionality of a new DRX configuration by RRC signaling including, onDurationTimer, drx-InactivityTimer, drx-RetransmissionTimer, drxStartOffset, shortDRX-cycle, drxShortCycleTimer to configure a new DRX functionality for the UE while the previous DRX functionality is operated. Herein, the UE can check the DRX re-configuration is received by the RRC signal (910).

When the UE receives the new DRX configuration, the UE checks whether the onDurationTimer is running or not (920). The UE can determine that the onDurationtimer in active with the predetermined time value using before DRX configuration.

Then, the UE checks whether any of drxStartOffset or onDurationTimer included in the new DRX configuration is different from previously applied DRX configuration. That is, if the UE can determine the new DRX configuration by comparing the new DRX configuration to re-configure with the previous DRX configuration. The UE can determine whether one among the onDurationTimer, drx-InactivityTimer, drx-RetransmissionTimer, drxStartOffset, shortDRX-cycle, and drxShortCycleTimer may be changed (930).

For example, in this invention, the UE checks the OnDuration specified in the newly received DRX configuration is different from the OnDuration specified in the previous DRX configuration. More details, this invention show that the OnDuration specified includes the onDurationTimer or the drxStartOffset can be changed.

If the UE identifies that one of the new DRX configuration is modified or changed, UE can stop the running onDurationTimer started with the previous DRX configuration (940). That is, the UE control to stop the onDurationTimer when the UE receives the new RRC signaling including the new DRX configuration while there is a running onDurationTimer. Therefore, the UE saves power consumption more effectively. It provides that the UE do not need to monitor the PDCCH for DL/UL transmission because of the new DRX configuration. It also provides that the UE immediately applies the new DRX configuration, which means that the starting point and the duration of the timers can be changed by the new DRX reconfiguration.

After stopping the onDurationTimer, the UE can determine that the UE uses the short DRX Cycle and the UE starts the drxShortCycleTimer if the short DRX Cycle with the new DRX configuration is configured. Else, the UE uses the long DRX Cycle with the new DRX configuration. More details, the UE can determine that the onDurationTimer starts at a new sunframe based of [(SFN*10)+subframe number]modulo (shortDRX-Cycle)=(drxStartOffset) modulo (shortDRX-Cycle) when the Short DRX Cycle of the new DRX reconfiguration is used. And if the Long DRX Cycle of the new DRX reconfiguration is used, the onDurationTimer can start at a new sunframe based of [(SFN*10)+subframe number]modulo (longDRX-Cycle)= drxStartOffset with the new DRX configuration.

Otherwise, the UE determines that the new DRX configuration is re-configured as same as the previous DRX configuration, that is, the UE determines that any of drxStartOffset or onDurationTimer included in new DRX configuration is same with those of previously applied DRX configuration and then, the UE keeps the running onDuration timer (950).

While keeping the running onDuration timer, the UE can calculate the new DRX functionality with the new DRX configuration. And then the UE can support the new DRX functionality at time to start onDurationTimer based on the new DRX configuration.

Therefore, the proposed invention includes that the UE immediately applies the DRX configuration when the UE receives modified DRX configuration while the onDurationTimer is running. So, the UE can move out of the OnDuration and the onDurationTimer keeps running by selectively stopping the running onDurationTimer so that they can be applied in the newly received DRX configuration more rapidly and efficiently.

Although the aforementioned embodiment shows the DRX operation of the UE for example, the proposed invention is applicable to a DRX operation of a machine to machine (M2M) device or a machine-type communication (MTC) device. MTC is one type of data communication including one or more entities not requiring human interactions. That is, the MTC refers to the concept of communication performed by a machine device, not a terminal used by a human user, by using the existing wireless communication network. The machine device used in the MTC can be called an MTC device. There are various MTC devices such as a vending machine, a machine of measuring a water level at a dam, etc.

Figure 10:
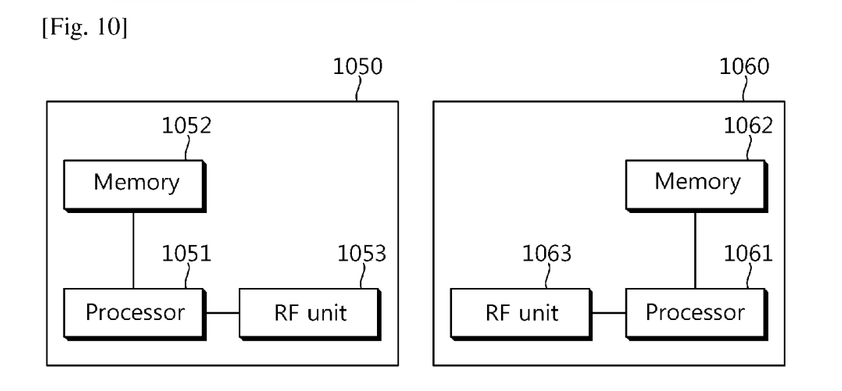
FIG. 10 shows a block diagram showing a wireless communication system according to an exemplary embodiment of the present invention.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 51, and transmits and/or receives a radio signal. The processor 1051 implements the proposed functions, procedures, and/or methods. In the embodiments of FIG. 7 to FIG. 9, the operation of the BS can be implemented by the processor 51.

Especially, the processor 1051 configures and sets the DRX configuration and CSI transmission configuration with CQI masking on the UE. Herein, the DRX configuration is included to set to UE with both the Short DRX cycle and the Long DRX cycle.

More details for this invention, the processor 1051 configures with DRX functionality by RRC signaling, including onDurationTimer, drx-InactivityTimer, drx-RetransmissionTimer, drxStartOffset, and optionally shortDRX-cycle, drxShortCycleTimer for a DRX configuration of the UE. Also the processor 1051 re-configures a new DRX functionality by RRC signaling including, onDurationTimer, drx-InactivityTimer, drx-RetransmissionTimer, drxStartOffset, shortDRX-cycle, drxShortCycleTimer to configure a new DRX configuration for the UE. Herein the new DRX configuration can be modified or set considering the traffic and scheduling policy for the UE.

The processor 1051 controls that the OnDuration specified in the newly configured DRX configuration is different from the OnDuration specified in the previous DRX configuration. More details, this processor 1051 configures that the onDurationTimer or the drxStartOffset in the OnDuration specified can be changed or modified.

The processor 1051 estimates that the UE can stop the onDurationTimer as soon as the UE receives the RRC signaling including the new DRX configuration while the onDurationTimer is running using the previous DRX configuration. Then, the processor 1051 can send PDCCHs with the new DRX configuration. It provides that the UE saves power consumption more efficiently. It includes that the UE applies to run the newly received DRX configuration more rapidly according to the eNB scheduling more actively.

A wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 8 to FIG. 10, the operation of the UE can be implemented by the processor 1061.

Especially, the processor 1061 configures and sets the DRX configuration and CSI transmission configuration with checking the RRC signal by the RF unit 1063. Herein, the DRX configuration is included to set to UE with both the Short DRX cycle and the Long DRX cycle. And the DRX configuration is included to set to UE with only the Long DRX cycle without the Short DRX cycle.

More details for this invention, the processor 1061 configures with DRX functionality by RRC signaling, including onDurationTimer, drx-InactivityTimer, drx-RetransmissionTimer, drxStartOffset, and optionally shortDRX-cycle, drxShortCycleTimer for a DRX configuration of the UE. Also the processor 1061 re-configures a new DRX functionality by RRC signaling including, onDurationTimer, drx-InactivityTimer, drx-RetransmissionTimer, drxStartOffset, shortDRX-cycle, drxShortCycleTimer to configure a new DRX configuration for the UE. Herein the new DRX configuration can be modified or set considering the traffic and scheduling policy for the UE.

Herein the processor 1061 can be comprised of a DRX configuration determination unit for checking the DRX configurations received via the RRC signaling.

The processor 1061 checks one of the DRX configuration or the new DRX configuration as re-DRX configuration is received by the RRC signal, and then the processor 1061 also checks whether the onDurationTimer is running or not when the new DRX configuration is checked to receive.

The processor 1061 can determine whether one among the onDurationTimer, drx-InactivityTimer, drx-RetransmissionTimer, drxStartOffset, shortDRX-cycle, and drxShortCycleTimer may be changed. Herein, the processor 1061 can determine that the OnDuration specified in the newly configured DRX configuration is different from the OnDuration specified in the previous DRX configuration. The processor 1061 can compare the new DRX configuration with the previous DRX configuration. For example, this processor

1061 determines that the onDurationTimer or the drxStartOffset in the OnDuration specified can be changed or modified.

The processor 1061 can determine that the onDurationTimer stop as soon as the RRC signaling including the new DRX configuration is received while the onDurationTimer is running using the previous DRX configuration. Then, the processor 1061 can control to monitor PDCCHs with the new DRX configuration to the RF 1063.

Of cause, the processor 1061 can calculate and apply the new DRX configuration, which means that the starting point and the duration of the timers can be changed by DRX reconfiguration when the modified DRX configuration is received. For example, the starting point of the On Duration can be changed by modified drxStartOffset and shortDRX-Cycle.

Herein the processor 1061 can be comprised of a checking unit and controller for comparing the DRX configurations and control the onDurationTimer stops/starts based on the comparison.

It provides that the UE'S DRX operation performs to save power consumption more efficiently.

The technical concept of the present invention is based on provisional documents as described in the below.

<Start of Priority Document>

In this invention, the UE stops the onDurationTimer when the UE receives the RRC signalling including the new DRX configuration while there is a running onDurationTimer. First, the UE stops the onDurationTimer when the UE receives the RRC signalling including the new DRX configuration. Second, the UE stops the onDurationTimer when the new DRX configuration specifies the On Duration that is different from the On Duration of previous DRX configuration.

The On Duration specified in the newly received DRX configuration is different from the On Duration specified in the previous DRX configuration when any of the contents listed below is changed.
  onDurationTimer
  drxStartOffset Invention 1)

The eNB configures to the UE with the DRX functionality by RRC signalling, including
  onDurationTimer
  drx-InactivityTimer
  drx-RetransmissionTimer
  drxStartOffset
  shortDRX-cycle
  drxShortCycleTimer
  When the UE is configured with the DRX functionality,
  If the short DRX Cycle is configured
  The UE uses the short DRX Cycle
  The UE starts the drxShortCycleTimer
  Else
  The UE uses the long DRX Cycle
  If the Short DRX Cycle is used and [(SFN*10)+subframe number]modulo (shortDRX-Cycle)=(drxStartOffset) modulo (shortDRX-Cycle); or
  if the Long DRX Cycle is used and [(SFN*10)+subframe number]modulo (longDRX-Cycle)=drxStartOffset:
  start onDurationTimer
  The eNB re-configures to the UE with the DRX functionality by RRC signalling, including,
  onDurationTimer
  drx-InactivityTimer
  drx-RetransmissionTimer
  drxStartOffset
  shortDRX-cycle
  drxShortCycleTimer
  If the UE receives new DRX configuration
  The UE stops the running onDurationTimer, if running.
  If the short DRX Cycle is configured
  The UE uses the short DRX Cycle
  The UE starts the drxShortCycleTimer
  Else
  The UE uses the long DRX Cycle
  If the Short DRX Cycle is used and [(SFN*10)+subframe number]modulo (shortDRX-Cycle)=(drxStartOffset) modulo (shortDRX-Cycle); or
  if the Long DRX Cycle is used and [(SFN*10)+subframe number]modulo (longDRX-Cycle)=drxStartOffset:
  start onDurationTimer Invention 2)

The eNB configures to the UE with the DRX functionality by RRC signalling, including
  onDurationTimer
  drx-InactivityTimer
  drx-RetransmissionTimer
  drxStartOffset
  shortDRX-cycle
  drxShortCycleTimer
  When the UE is configured with the DRX functionality,
  If the short DRX Cycle is configured
  The UE uses the short DRX Cycle
  The UE starts the drxShortCycleTimer
  Else
  The UE uses the long DRX Cycle
  If the Short DRX Cycle is used and [(SFN*10)+subframe number]modulo (shortDRX-Cycle)=(drxStartOffset) modulo (shortDRX-Cycle); or
  if the Long DRX Cycle is used and [(SFN*10)+subframe number]modulo (longDRX-Cycle)=drxStartOffset:
  start onDurationTimer
  The eNB re-configures to the UE with the DRX functionality by RRC signalling, including,
  onDurationTimer
  drx-InactivityTimer
  drx-RetransmissionTimer
  drxStartOffset
  shortDRX-cycle
  drxShortCycleTimer
  If the UE receives new DRX configuration
  If the onDurationTimer is running,
  The UE checks whether any of drxStartOffset or onDurationTimer included in new DRX configuration is different from those of previously applied DRX configuration.
  If any of drxStartOffset or onDurationTimer included in new DRX configuration is different from those of previously applied DRX configuration, the UE stops the running onDurationTimer.
  Else,
  Keep running onDurationTimer
  If the short DRX Cycle is configured
  The UE uses the short DRX Cycle
  The UE starts the drxShortCycleTimer
  Else
  The UE uses the long DRX Cycle
  If the Short DRX Cycle is used and [(SFN*10)+subframe number]modulo (shortDRX-Cycle)=(drxStartOffset) modulo (shortDRX-Cycle); or if the Long DRX Cycle is used and [(SFN*10)+subframe number]modulo (longDRX-Cycle)=drxStartOffset:
start onDurationTimer
<End of Priority Document>

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for configuring a DRX (Discontinuous Reception) operation in a wireless communication system, the method performed by a wireless device and; the method comprising:
   receiving, from a transmitter, a first configuration for the DRX;
   starting a first onDuration timer according to the first configuration;
   receiving, from the transmitter due to traffic or a scheduling policy of the wireless device, a second configuration for the DRX while the first onDuration timer is running;
   stopping the first onDuration timer when the second configuration is received from the transmitter, wherein at least one physical downlink control channel (PDCCH) is not monitored when the first on Duration timer is stopped, and wherein the first OnDuration timer is stopped without receiving a DRX Command medium access control (MAC) control element (CE); and
   starting a second onDuration timer according to the second configuration; and monitoring at least one PDCCH during an operation time of the second onDuration timer after the second onDuration timer starts according to the second configuration,
   wherein the second onDuration timer is started at a subframe which is a starting point of the second OnDuration timer which is changed by a drxStartOffset and a DRX-Cycle in the second configuration.

2. The method of claim 1, wherein the first onDuration timer is stopped at a subframe which is a point in time when the second configuration is received from the transmitter.

3. A wireless device for configuring a DRX (Discontinuous Reception) operation in a wireless communication system, the wireless device comprising:
   a radio frequency unit configured to receive for receiving a radio signal; and
   a processor, operatively coupled with the radio frequency unit, configured to:
      receive, from a transmitter a first configuration for the DRX,
      start a first onDuration timer according to the first configuration,
      receive, from the transmitter due to traffic or a scheduling policy of the wireless device, a second configuration for the DRX while the first onDuration timer is running,
      stop the first onDuration timer when the second configuration is received from the transmitter, wherein at least one physical downlink control channel (PDCCH) is not monitored when the first onDuration timer is stopped, and wherein the first OnDuration timer is stopped without receiving a DRX Command medium access control (MAC) control element (CE),
      start a second onDuration timer according to the second configuration, and
      monitor at least one PDCCH during an operation time of the second onDuration timer after the second onDuration timer starts according to the second configuration,
   wherein the second onDuration timer is started at a subframe which is a starting point of the second On Duration timer which is changed by a drxStartOffset and a DRX-Cycle in the second configuration.

4. The wireless device of claim 3, wherein the first onDuration timer is stopped at a subframe which is a point in time when the second configuration is received from the transmitter.

* * * * *